Figure 1:
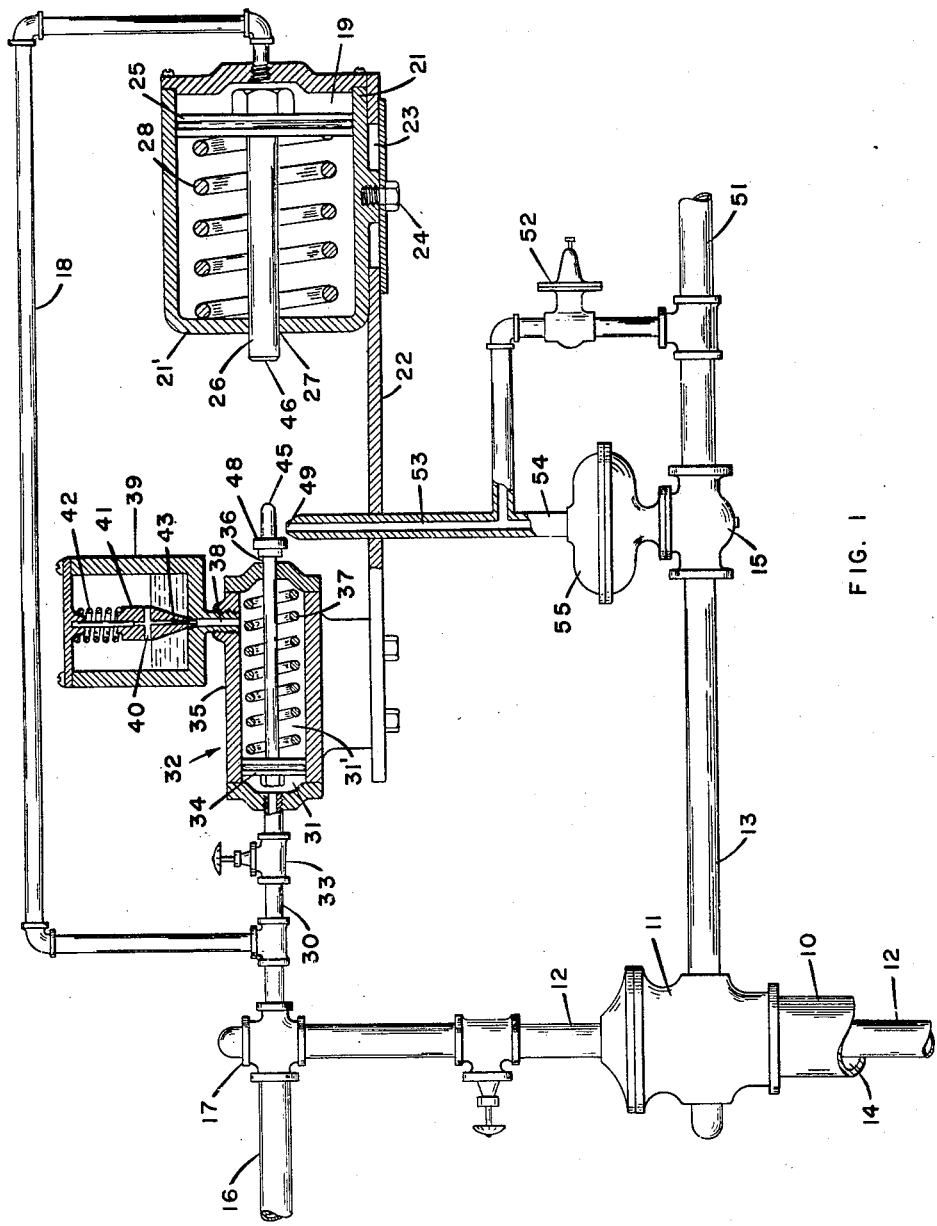

Sept. 6, 1960     R. P. VINCENT     2,951,451
GAS LIFT CONTROL APPARATUS
Filed Jan. 3, 1956     2 Sheets-Sheet 1

*INVENTOR.*
RENIC P. VINCENT
BY
*ATTORNEY*

United States Patent Office 2,951,451
Patented Sept. 6, 1960

2,951,451

GAS LIFT CONTROL APPARATUS

Renic P. Vincent, Tulsa, Okla., assignor to Pan American Petroleum Corporation, a corporation of Delaware Filed Jan. 3, 1956, Ser. No. 557,108

10 Claims. (Cl. 103—232)

This invention is directed to a method and apparatus for controlling the gas input to a gas lift well which produces intermittently. More particularly, this invention is directed to an apparatus for controlling the lifting gas-produced liquid ratio in a well which produces by intermittent gas lift by automatically varying the rate of gas injection in proportion to the productivity of the well.

Gas lift wells may be divided generally into two classes. The first class includes those wells which are produced continuously. Here, the production column is aerated to such an extent that the hydrostatic head at the bottom of the column is less than the formation pressure. In the second type, to which this invention is in part directed, the liquid produced into the well accumulates in the bottom of the well or within a chamber in the bottom of the well for a predetermined period of time. This accumulated liquid is then produced either by aerating the column or by displacing the accumulated liquid as a slug to the surface with lifting gas.

I have found that in this second type of operation, the lifting efficiency is substantially improved by lifting the accumulated liquid as a slug with a minimum amount of aeration and gas bypassing of the liquid. In this operation, the maximum lifting efficiency is attained, however, only when the ratio of lifting gas to liquid is properly adjusted. If the ratio is too low, the slug of liquid will not be completely removed from the production conduit when gas is periodically injected into the well. The gas will tend to bubble through the slug of liquid as the slug slows down or stops in the well; thus, the gas will lift only a part of the slug. If the ratio is too high, any excess gas is wasted. It has been necessary to inject a substantial excess of gas to insure that the slug of liquid reaches the surface. If gas injection is to infrequent, the accumulation of liquid in the well decreases its productivity. Maximum lifting efficiency is obtained when the gas excess is substantially zero. The same conclusions apply to all types of intermittent operation, including the gas lifting of wells by use of free pistons and the like. Free pistons are solid dividers, such as balls, placed below a slug of liquid to separate it from the gas.

In the production of these intermittent gas lift wells by slug flow, I have found that by careful adjustment the well can be made to produce at maximum efficiency. However, the productivity of most wells changes from time to time. This is particularly the case in prorated wells which are shut down occasionally for several days. Consequently, even if the frequency of gas injection and/or the quantity of gas intermittently injected into such wells is initially adjusted for maximum efficiency, production does not continue at the maximum lifting efficiency for a long period of time. Such wells, accordingly, require periodic attention to maintain high lifting efficiency. Various attempts have been made to provide means for automatically adjusting the rate of gas injection in intermittent gas lift wells to maintain maximum lifting efficiency. The systems used generally include means to initiate gas injection by sensing the liquid buildup in the well. Gas injection may be terminated by various automatic means such as the arrival of liquid at the surface. None of these methods has been used extensively; apparently because the apparatus for sensing the level of the liquid in the well is either too insensitive or too expensive to justify its use or because it does not accomplish the desired result.

Figure 2:
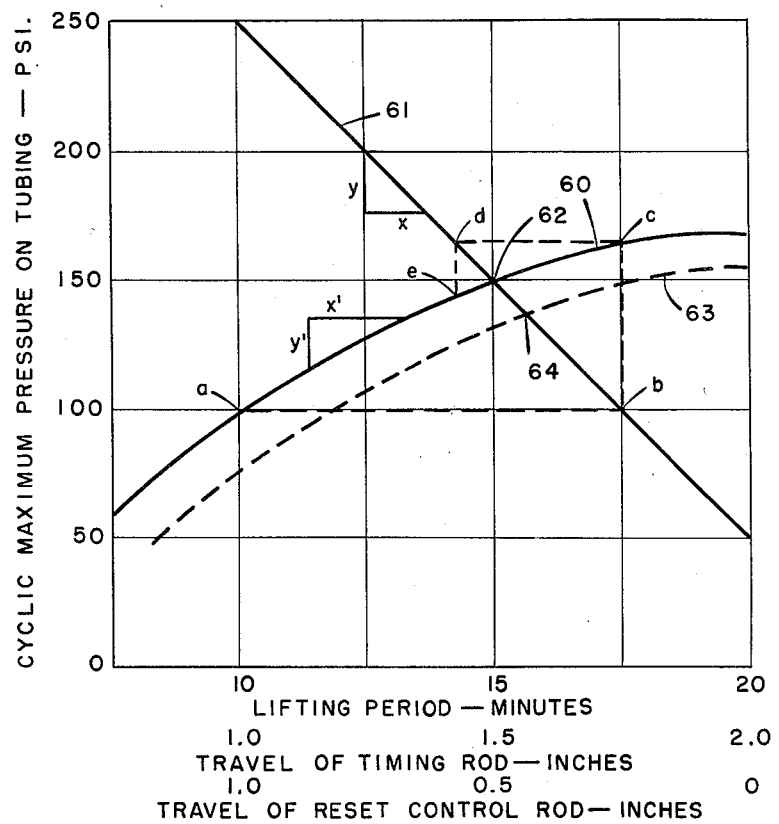

It is, therefore, an object of this invention to provide an improved method and apparatus for automatically controlling gas injection into an intermittent gas lift well. Another object of this invention is to provide an apparatus for controlling the lifting gas-liquid ratio of a well produced by intermittent gas lift to maintain a high lifting efficiency. It is a more specific object of this invention to provide an automatic device, controlled generally by the productivity of a well and particularly by the pressure in the production conduit, for regulating the input gas to a well produced by intermittent gas lift so that the quantity of gas injected per unit of time is proportional to the current productivity of the well and so that any change in productivity is automatically compensated by a change in the rate of gas injection. These and other objects of this invention will become apparent from the following description. In this description, reference will be made to the accompanying drawing in which:

Figure 1 shows a wellhead for an intermittent gas lift well and a device partially in cross section for controlling the lifting gas-produced liquid ratio of the well, and Figure 2 shows a plot of the productivity characteristics and corresponding control constant for a typical well.

It have found that the lifting efficiency of a well produced by intermittent gas lift is indicated by the cyclic or periodic maximum pressure at the surface on the tubing or other production conduit following a slug of produced liquid. A low maximum cyclic pressure appears to indicate that the slugs of liquid either are shorter than desirable or the slugs of liquid are too large for the amount of gas injected so that the slugs do not reach the surface.

The productivity of a well, as is well known, depends upon and varies as an inverse function of the back pressure maintained upon the producing formation. It is accordingly desirable to maintain a low back pressure on the well, i.e., to prevent a large liquid accumulation in the well. This indicates a short producing period each cycle, i.e., high frequency lifting cycles. The lifting efficiency, on the other hand, varies as a direct function of the liquid accumulation in the well, i.e., the average back pressure on the producing formation, and, accordingly, on the cyclic peak pressure maintained on the producing formation. The productivity of a well is thus dependent upon two opposing phenomena and the maximum productivity is attained at some intermediate lifting frequency. Furthermore, the length of a producing period is in some cases limited by the available lifting gas pressure. Accordingly, I have found that the rate and quantity of gas injection should be controlled so that the well produces by slug flow and so that the length of the slugs is at an optimum when they reach the surface. This invention, therefore, in brief comprises a method and apparatus for controlling the lifting gas-produced liquid ratio by varying the quantity of gas injected over a long period of time in proportion to the maximum pressure of cyclic pressure surges or peaks on the well tubing at the surface, said maximum pressure being indicative of the quantity of liquid in a slug lifted on the previous lifting cycle.

For a more detailed description of this invention, the construction and operation of one embodiment of a suitable apparatus, as shown in Figure 1 of the drawings, will now be explained.

A well casing 10 is cemented in a well in the usual manner. This casing has a tubing head 11 which supports and seals around a tubing string or production conduit 12. The tubing, as usual, extends to a depth in the well below the liquid level so that gas injected into the casing through the supply or lifting gas inlet line 13 displaces the well fluids up through the production conduit. Gas injected into the well flows down through the annular space 14 surrounding the tubing and is admitted into the tubing through a gas lift valve, or the like, as is well known in the art. The casing and annular space 14 thus comprise in this example a power gas conduit which is concentric with the production conduit 12. Obviously, a second conduit parallel to rather than concentric with the tubing can be used. See, for example, my U.S. Patent 2,698,582 in which lifting gas and balls are injected into one conduit and these together with the produced liquid are displaced out of the well via a second parallel conduit. In any case, an accumulation chamber involving either the lower end of the annular space 14 or a separately enclosed accumulation chamber is provided at the bottom of the well. The amount of fluid which accumulates in the well or in the accumulation chamber during any lifting cycle is dependent upon the productivity characteristics of the well and the length of the lifting cycle, as indicated above. The length of each producing cycle is accordingly initially regulated so that the well has the maximum or other desired productivity, i.e., so that a desired amount of liquid is produced into the accumulation chamber each producing cycle. When a predetermined amount of liquid as indicated by previous productivity has accumulated in this chamber, gas is injected at high rate into the well through a motor-operated intermitter valve 15 via gas line 13 and annular space 14 and displaces liquid as a slug from the accumulation chamber up through production conduit 12 and out flow line 16 to storage, such as a tank battery or the like.

The instantaneous gas injection rate, regardless of the overall rate of gas injection, is sufficiently high to promote slug flow, i.e., substantially above the rate at which the gas bubbles through and merely aerates the liquid column in the tubing. Assuming that sufficient gas has been injected into the well to displace the slug of liquid from the well, the pressure at the flow T 17 commences to rise as the slug of liquid reaches the surface. This pressure rises to a maximum as the lower end of the slug reaches this flow T. The pressure in the flow T is transmitted via line 18 to a reset control chamber 19. This reset control chamber is formed in a reset control cylinder 21 which is adjustably connected to a base 22. This base has a slot 23 which permits longitudinal adjustment of the reset control cylinder by loosening the cap screw 24 and sliding the cylinder either to the left or right. A reset control piston 25, having a piston rod 26 which extends through an opening 27 in the head 21' of the reset control cylinder, is moved by the pressure in the tubing to compress reset control spring 28. Since the displacement of a spring is proportional to the force on the spring, the reset control piston 25 and piston rod 26 are constantly displaced to the left in an amount proportional to the pressure on the tubing, and, this pressure being greatest behind a slug of liquid, they are displaced a maximum distance each time the lower end of a slug of liquid arrives at the surface.

When the bottom of the liquid slug arrives at the surface, and the pressure due to the weight of the slug is transmitted to the reset control chamber, this pressure is also transmitted via line 30 to chamber 31 in an escapement mechanism or timing device 32 which sets the time at which gas will next be injected into the well. This chamber is also attached to base 22. The surface tubing pressure is transmitted through a choke or adjustable throttle valve 33 which causes the movement of timing rod piston 34 in timing cylinder 35 to be relatively slow in comparison to the movement of reset control piston 25 in cylinder 21. Fluid flow through throttle valve 33 displaces timing rod piston 34 and timing rod 36 to the right against the force of a spring 37. That part 31' of chamber 31 on the back side of timing rod piston 34 is filled with a liquid which is in fluid communication through port 38 with a liquid reservoir 39. The amount of hydraulic fluid such as water or oil in reservoir 39 is sufficient to fill the back part 31' of chamber 31 when piston 34 is in its far left position and to fill partially reservoir 39 above the outlet 40.

As the pressure at the top of the tubing increases, timing rod piston 34 and timing rod 36 are displaced rapidly to the right and the hydraulic fluid in the back part 31' of chamber 31 is displaced into reservoir 39. This liquid can be transferred into the reservoir at a relatively high rate since the throttle check valve 41 is raised against spring 42 to permit the liquid to bypass the timing orifice 43 and flow directly into the reservoir from the chamber. As this timing rod piston 34 is displaced to the right, it displaces the timing rod to the right until the timing rod end 45 contacts the reset piston rod end 46. Reset control piston 25 being substantially larger, having for example an area 10–100 times as great as the area of timing rod piston 34, and the flow of liquid to reset control chamber 19 being relatively unrestricted, reset control piston rod 26 arrives at an equilibrium position, depending upon the pressure in the tubing, before timing rod 36 arrives at its equilibrium position. Spring 37 is typically so weak, however, that it exerts little influence on the movement of the timing rod to the right so that the timing rod never does reach an equilibrium position except when it is stopped by striking the end of reset control piston rod 26. Thus, the position of reset control piston rod end 46 controls the final right hand position of timing rod piston 34 and timing rod 36. The greater the surface tubing pressure, the greater the movement of reset piston rod 26 to the left and the smaller the movement of timing rod 36.

After the slug of liquid in the tubing, and therefore the pressure surge in the tubing, has passed, the pressure in reset control chamber 19 and in time control chamber 31 decreases and the escapement mechanism starts to run. Spring 28 displaces reset control piston 25 back to the right, and, simultaneously the timing rod spring 37 urges timing rod piston 34 to the left, drawing fluid from reservoir 39 into chamber 31' through orifice 43. Before timing rod piston 34 is completely returned to its initial position, valve member 48 which is adjustably mounted by a set screw or the like on timing rod 36 passes jet 49, shutting off the flow of gas from gas supply main 51 and pressure regulator 52 through gas line 53. This flow is then temporarily diverted into gas line 54 and the pressure dome 55 of motor-operated intermitter valve 15. The buildup of pressure in dome 55 opens the valve and the valve remains open as long as the valve member 48 covers jet 49. The period of gas injection during each injection cycle can obviously be controlled by adjusting the axial length of valve member 48. Typically, the period varies from about ¼ to about 5 minutes, depending upon the productivity of the well, the pressure of the supply gas, etc. After valve member 48 passes jet 49, the gas in line 53 escapes through the jet allowing the pressure in dome 55 to decrease, thereby closing motor-operated intermitter valve 15. The valve member is then held in this position to the left of the jet until the next slug of liquid is produced. It then moves, due to the pressure in the tubing, rapidly to the right past the jet 49 so that generally the pressure buildup in dome 55 is not sufficient to open the motor-operated intermitter valve. With this arrangement, i.e., with the axial length of valve member 48 fixed, it can be seen that the quantity of gas injected each cycle remains substantially constant but that the period between injection cycles, the quantity of gas injected per unit time and accordingly the gas-liquid ratio, depend upon the length of travel of the cam and the timing rod before the valve member interrupts the flow of gas through jet 49. This length of travel is likewise dependent upon the initial displacement of the valve member to the right, which is in turn controlled by the displacement of reset control piston 25.

In operation, the available pressure on the supply gas, the productivity characteristics of a gas lift well, and the like, are first determined and then the rate and amount of gas required per cycle, and frequency of gas injection are established by calculation or by trial and error so that the well is producing liquid slugs of a desired length. The time controller variables such as the spring constant of spring 28, the diameter of reset time control piston 25, the size of orifice 43, the position of valve member 48 on timing rod 36, etc. are then established or set up to maintain this desired length. For example, a valve member length may be first selected to inject sufficient gas to lift a liquid slug length which produces a desired cyclic peak pressure. If the well produces that amount of liquid in 15 minutes, the gas injection frequency may be set to vary from less than about 1 to about 10 or more cycles per hour. The variables such as the reset control constant, i.e., the pressure in the reset control chamber 19 in p.s.i. per inch of travel of reset control piston 25 and rod 26, are then set up initially to inject gas into the well at a frequency of 4 cycles per hour when the well is producing at equilibrium and stable conditions. Displacement of reset control piston 25 is dependent upon the area of the piston and the stiffness of reset control spring 28. The reset control constant depends upon these variables. Generally, the reset control constant is, therefore, the pressure in p.s.i. on a piston having an area of 1 square inch required to displace piston 25 by a distance of 1 inch. Obviously, the same reset control constant may be maintained by changing the area of piston 25 and the stiffness of spring 28 proportionately. At this initial gas injection frequency, the amount of gas injected is preferably not more than about 5 percent in excess of the gas theoretically required to lift the liquid slug. The well will then continue to produce at this initial frequency until the productivity of the well changes. Typically, the productivity tends to decrease with time, i.e., after producing for a day or two, the well produces less liquid during the preset period. When the productivity decreases, the length of the liquid slug produced during any one cycle is similarly decreased. The decrease in the length of the slug, as indicated above, decreases the maximum cyclic pressure at the wellhead behind the slug of liquid. This decrease in maximum cyclic pressure then displaces reset control piston 25 to the left a shorter distance than when the well was producing a larger slug of liquid. A smaller movement of reset control piston rod 26 allows a greater movement of timing control rod 36 so that the frequency of gas injection is decreased, i.e., the period of time required for the time control rod 36 to move valve member 48 to the left from the greater signal or starting position and cover jet 49 is increased. This increased length of time then permits the well to produce more fluid into the well before motor-operated intermitter valve 15 is again opened. The increased production into the well then causes the size of the next slug of liquid lifted out the tubing and the maximum pressure beneath that slug of liquid to be increased somewhat proportionally. This greater maximum pressure beneath the slug is likewise transmitted to the reset control chamber 19, displacing reset control piston 25 and reset control piston rod 26 to the left a greater amount than on the previous cycle. This greater movement of the reset control piston decreases the amount of movement of timing rod 36 so that, after being started, the valve member 48 will cover jet 49 within a shorter period of time than on the previous cycle. Continuous changing of the frequency of gas injection, i.e., hunting, is prevented by undercompensating for the indicated correction each time a correction is made so that the gas injection frequency tends to change only as the productivity of the well changes. To undercompensate, the change in period is preferably always less than the change indicated by a variation in the maximum pressure signal following consecutive slugs of liquid. This is accomplished by making the reset control constant greater than the change in the productivity characteristics which are indicated by the change in maximum pressure in the production tubing in p.s.i. per inch of travel of the timing rod 36. In other words, the reset control constant (cyclic maximum pressure in p.s.i. per inch of reset control piston displacement) must be greater, typically 5 to 100 percent or more greater, than the productivity characteristics of the well (change in cyclic maximum pressure in p.s.i. per inch of travel of the timing rod).

An example of a suitable apparatus for accomplishing this result will be described. In this description, reference will be made to Figure 2. The productivity characteristics of a well, which for the purpose of this description and the claims are defined above, are an indication of the ability of a well to product against various back pressures. The initial productivity characteristics of a typical well are shown in curve 60. As indicated by this curve, the well will produce a slug of liquid having a peak pressure in the tubing of about 100 p.s.i. if the well is produced cyclically at a frequency of 6 cycles per hour, i.e., at a lifting or producing period of 10 minutes. As indicated by this curve also, the well initially will produce a 150 p.s.i. slug of liquid when the well is lifted at a frequency of 4 cycles per hour, i.e., at 15 minute lifting periods. Similarly, at a frequency of 3 cycles per hour, the well will produce slugs having a maximum pressure of 170 p.s.i.

From this curve it can be seen that initially the peak pressure of the well varies from 170 to 100 p.s.i. for a 1 inch travel of the timing rod. In accordance with the above rule, the reset control constant must, therefore, be greater than (170–100)/1, i.e., greater than 70 p.s.i. per inch. Curve 61 which has a greater slope, $y/x$, than the slope of curve 60 at all points within the operating range, $y'/x'$, accomplishes this result. The reset control constant, as indicated by this curve 61, is (250–50)/1 or 200 p.s.i. per inch of travel of the reset control rod. In other words, the area of reset control piston 25 and the strength of reset control spring 28 are correlated so that a pressure differential of 200 p.s.i. in the reset control chamber 19 moves the piston rod to the left 1 inch. Reset control spring 28 is, in this case, prestressed at zero position in an amount equal to a pressure of 50 p.s.i. in the reset control chamber. Under these conditions, the spacing between the end 46 of reset control piston rod 26 at zero position and jet 49 is approximately 2 inches. Movement of time control rod 36 may be any amount greater than 2 inches and may be set at, for example, 3 inches. For an injection period of 1 minute where the time control rod moves 2 inches in 20 minutes, the axial length of valve member 48, which controls the length of time gas is injected into the well, is set at 1/20×2 inches or 0.1 inch. This length is increased proportionately in case jet 49 has an appreciable length. The area of time control piston 34 is desirably very small in comparison to the area of reset control piston 25. For example, the timing rod piston may be from about 1 to about 5 percent of the area of the reset control piston so that the force produced by the timing rod on the reset control piston rod 26 after the two meet is substantially negligible.

Assuming a gas supply pressure of greater than about 250 p.s.i., if the gas injection into the well is started at a frequency of about 6 cycles per hour, i.e., at a lifting period of 10 minutes, the well will produce a slug of liquid having a maximum pressure of 100 p.s.i., as indicated at point a on curve 60. This pressure of 100 p.s.i. will then displace reset control piston rod 26 0.25 inch to the left, as indicated at point b on curve 61. At this displacement, the timing rod will travel 1.75 inches to the right where it is stopped by the reset control piston rod. The well will then produce 17.5 minutes before valve member 48 covers jet 49 and starts another gas injection cycle. During this producing period, the well will produce a slug of liquid having a maximum pressure of 165 p.s.i., as indicated at point c on curve 60. When this slug of liquid reaches the surface, it will displace the reset control piston 0.575 inch to the left, as indicated at point d on curve 61. The well will then produce 14.25 minutes and lift a slug of liquid having a maximum pressure of 143 p.s.i., as indicated at point e on curve 60. As additional slugs of liquid are lifted, it can be seen that the gas injection cycles tend to stabilize at 15 minute intervals, i.e., at point 62, the intersection of curves 60 and 61. The well then initially produces with a lifting period of 15 minutes. Eventually the productivity characteristics of the well decrease so that the well does not produce as much liquid per unit time as previously produced against any given back pressure. The productivity characteristics of the well at some later time are, therefore, indicated by curve 63. It can readily be seen that as these productivity characteristics gradually change, the lifting period gradually changes from point 62 to point 64, the point at which the curves 61 and 63 intersect. It can also readily be seen that regardless of the change in productivity, i.e., the ability to produce against a given back pressure, as indicatted by the productivity characteristics curve, over a very wide range, the gas control apparatus will change the frequency of gas injection automatically to compensate for the change in productivity.

Various modifications of the above-described apparatus, which has been given by way of example, will be apparent to those skilled in the art. For example, while reference has been made in this example to a fixed period for gas injection and a variable "off" period, it will be apparent that the input gas-produced liquid ratio can be controlled by controlling other variables. In some cases, it is desirable to have a fixed time cycle. In that case, the gas-on and gas-off periods can be maintained constant and the gas injection rate can be varied. Similarly, the ratio of the periods of gas-on to gas-off can be regulated. In the case of a variable time cycle, such as that described in the example, it will also be apparent that the gas-off period can be fixed and the gas-injection period can be varied. Further, it can be seen that more than one variable can be changed to control the lifting gas-liquid ratio. For example, if the injection period is fixed, as in the above example, the off period can be fixed and both the injection period and injection rate can be varied. I contemplate also that while a pneumatic time control is desired, other timing means can be employed. A clock movement in which the maximum time limit is set by the reset control mechanism could obviously be substituted for the hydraulic apparatus described. Accordingly, it can be seen that this invention is not limited to the specific embodiments described above. The invention should, therefore, be construed to be limited only by the scope of the appended claims.

I claim:

1. A method for controlling the lifting gas-produced liquid ratio of an intermittent gas lift well comprising injecting a quantity of lifting gas through a power gas conduit below the level of liquid in said well, displacing liquid to the surface through a production conduit with said lifting gas, and varying the amount of gas injected per unit time as a function of the cyclic maximum pressure at the surface on said production conduit to maintain a minimum lifting gas-produced liquid ratio.

2. An apparatus for controlling an intermittent gas lift well comprising a power gas line to said well, a power gas conduit in said well, a production conduit in said well extending to below the fluid level therein, a gas inlet valve in said power gas line, a time controller connected to said gas inlet valve for periodically opening and closing said valve, and a reset controller associated with said time controller and hydraulically connected to the upper end of said production conduit, said reset controller being actuated by the periodic maximum pressure in said production conduit for setting the period of said time controller.

3. An apparatus for controlling an intermittent gas lift well including a production conduit in said well extending to below the liquid level therein, a power gas conduit in said well extending to below said liquid level to inject gas into said production conduit below said liquid level, a valve in said power gas conduit, a time controller for periodically opening and closing said valve, said time controller comprising a fluid escapement mechanism which produces a movement substantially linear with time, first conduit means connecting said time controller to the upper end of said production conduit, a reset control mechanism associated with said time controller, and second conduit means hydraulically connecting said reset control mechanism to the upper end of said production conduit, said time controller being started periodically by a periodic peak pressure in said production conduit and running for a period until said time controller opens and then closes said valve to admit a quantity of gas into said production conduit and lift a slug of liquid, and said reset control mechanism being set by said periodic peak pressure to define said period.

4. An apparatus for controlling the lifting gas-produced liquid ratio of an intermittent gas lift well comprising a power gas conduit in said well, a production conduit in said well extending into said well to below the fluid level therein, intermitter valve means periodically to inject a quantity of lifting gas into said power gas conduit for displacing liquid to the surface through said production conduit, a lifting gas-produced liquid ratio control device responsive to fluid pressure to change the lifting gas-produced liquid ratio, means transmitting the pressure in said production conduit at the surface to said ratio control device, and means connecting said ratio control device with said intermitter valve means to open and close said intermitter valve means and to vary the rate of gas injection per unit time as a function of the variation in the cyclic maximum pressure in said production conduit to thereby maintain a minimum lifting gas-produced liquid ratio.

5. An apparatus for controlling the lifting gas-produced liquid ratio of an intermittent gas lift well comprising a power gas conduit in said well, a production conduit in said well extending into said well to below the fluid level therein, intermitter valve means connected to the upper end of said power gas conduit and adapted to admit lifting gas from a gas supply into said power gas conduit, lifting gas-produced liquid ratio control means, means connecting said control means to said intermitter valve means for actuating said intermitter valve means and periodically admitting a quantity of said lifting gas into said power gas conduit for displacing liquid to the surface through said production conduit, a fluid conduit connecting said ratio control means and the upper end of said production conduit and transmitting pressure from said production conduit to said ratio control means, said ratio control means being actuated by the periodic maximum pressure in said production conduit to open said intermitter valve means and to vary the period said intermitter valve means is closed, the length of said period being varied inversely as the change in pressure between consecutive maximum pressure surges in said production conduit.

6. A timing device for controlling gas injection to an intermittent gas lift well having a gas inlet valve and a production conduit comprising an escapement mechanism, means associated with and actuated by said escapement mechanism for maintaining said valve closed for a predetermined period of time and then first opening and then reclosing said valve, means including a hydraulic connection to the upper end of said production conduit for resetting said escapement mechanism when a peak pressure develops in said production conduit, an escapement mechanism reset control responsive to fluid pressure and associated with said escapement mechanism to control said period of time, and conduit means connecting said reset control mechanism to the upper end of said production conduit.

7. A device for controlling gas injection to an intermittent gas lift well having a gas inlet valve and a production conduit comprising a timing cylinder, a timing piston in said timing cylinder, resilient means to urge said timing piston in one direction in said cylinder, a timing rod moved by said timing piston, an escapement mechanism to define the rate of travel of said timing piston and said timing rod as said timing piston is moved in said timing cylinder by said resilient means, means connecting said timing cylinder and said production conduit so that the pressure in said production conduit is transmitted to said timing cylinder to periodically displace said timing piston in said timing cylinder in a direction opposite to that produced by said resilient means whenever there is a pressure increase in said production conduit and so that said timing rod and escapement mechanism start to run when said pressure decreases, valve means on said timing rod to open said gas inlet valve when said timing rod is in a predetermined position, a reset control cylinder, a reset control piston in said reset control cylinder, said reset control piston being substantially larger than said time control piston, a reset control rod actuated by the movement of said reset control piston, means connecting said reset control cylinder and said production conduit so that the pressure in said production conduit is applied against said reset control piston, and resilient means to oppose the movement produced by said pressure against said reset control piston so that the position of said reset control rod is a function of said pressure in said production conduit, said timing rod and said reset control rod being so constructed and arranged that the movement of said timing rod produced by a pressure surge in said production conduit is limited by the position of said reset control rod produced by said pressure surge, whereby the travel of said timing rod and the opening of said gas inlet valve is time controlled by the cyclic maximum pressure in said production conduit.

8. A device for controlling gas injection into a well according to claim 7 wherein the parts are so constructed and arranged that the cyclic maximum pressure in pounds per square inch per inch of travel of said reset control rod is greater than the change in the cyclic maximum pressure in pounds per square inch per inch of travel of said time control rod.

9. An apparatus for controlling an intermittent gas lift well comprising a production conduit in said well extending to below the liquid level therein, a power gas conduit in said well extending from the surface to below said liquid level for injecting power gas into said production conduit below said liquid level, a valve in said power gas conduit, a time controller hydraulically connected to the upper end of said production conduit for periodically opening and closing said valve, a reset controller, means hydraulically connecting said reset controller to the upper end of said production conduit, and means connecting said reset controller and said time controller, said last-named means being so constructed and arranged that said reset controller is actuated by the periodic maximum pressure in said production conduit to set the period of said time controller.

10. An apparatus for controlling an intermittent gas lift well comprising a production conduit in said well extending to below the liquid level therein, a power gas conduit in said well extending to below said liquid level to inject gas into said production conduit below said liquid level, a valve connected to the upper end of said power gas conduit for controlling gas input to said well, a time controller for periodically opening and closing said valve, a reset controller cylinder, a piston in said cylinder, means connecting said cylinder hydraulically to said production conduit at the surfaces for displacing said piston in said cylinder in one direction as the pressure in the upper end of said production conduit is increased, resilient means urging said piston in the opposite direction in said cylinder, and means including said piston for resetting said time controller each time a major pressure surge occurs in said production conduit.

References Cited in the file of this patent

UNITED STATES PATENTS

| | | |
|---|---|---|
| 1,754,945 | Haskell | Apr. 15, 1930 |
| 2,245,005 | Nixon | June 10, 1941 |
| 2,633,086 | Zaba | Mar. 31, 1953 |
| 2,797,648 | Carpenter | July 2, 1957 |